United States Patent
Cho et al.

(10) Patent No.: US 8,533,242 B2
(45) Date of Patent: Sep. 10, 2013

(54) FILE MANAGEMENT METHOD IN WEB STORAGE SYSTEM

(75) Inventors: Sung-Min Cho, Seoul (KR); Hyoung-Woo Son, Seoul (KR)

(73) Assignee: ESTsoft Corp., Seoul (KR)

( * ) Notice: Subject to any disclaimer, the term of this patent is extended or adjusted under 35 U.S.C. 154(b) by 0 days.

(21) Appl. No.: 13/308,987

(22) Filed: Dec. 1, 2011

(65) Prior Publication Data

US 2012/0143930 A1 Jun. 7, 2012

(30) Foreign Application Priority Data

Dec. 7, 2010 (KR) ........................ 10-2010-0124046

(51) Int. Cl.
*G06F 17/30* (2006.01)
(52) U.S. Cl.
USPC .......................................................... 707/827
(58) Field of Classification Search
USPC .......................................................... 707/827
See application file for complete search history.

(56) References Cited

U.S. PATENT DOCUMENTS

2010/0332479 A1* 12/2010 Prahlad et al. ................ 707/741

FOREIGN PATENT DOCUMENTS

| KR | 10-2004-0070382 | 8/2004 |
| KR | 10-0740682 | 7/2007 |

* cited by examiner

*Primary Examiner* — Sheree Brown
(74) *Attorney, Agent, or Firm* — Occhiuti Rohlicek & Tsao LLP

(57) ABSTRACT

The present invention relates to a file management method in a web storage system, and more specifically, to a file management method in a web storage system, in which when a user connects to the web storage system and creates, updates and stores files, files of a specific type are all deleted from a local PC and stored only in a file management system, and thus none of data is stored in the local PC.

According to the present invention, when a file is created and stored using a web storage system, none of data related to a file that may cause a security problem remains in a user terminal of a remote site, and thus a file leakage problem may be cleared.

5 Claims, 5 Drawing Sheets

FILE MANAGEMENT METHOD IN WEB STORAGE SYSTEM

CROSS-REFERENCE TO RELATED APPLICATIONS

This application claims the priority of Korean application 10-2010-0124046, filed Dec. 7, 2010. The contents of the application are hereby incorporated by reference in its entirety.

FIELD OF THE INVENTION

The present invention relates to a file management method in a web storage system, and more specifically, to a file management method in a web storage system, in which when a user connects to the web storage system and creates, updates and stores files, files of a specific type are all deleted from a local PC and stored only in a file management system, and thus none of data is stored in the local PC.

BACKGROUND OF THE RELATED ART

Most of works performed in an enterprise are accomplished using a computer, and computing environments of the enterprise are generally configured by connecting a plurality of client terminals to a server. In addition, electronic files created in a client terminal are stored in the client terminal or the server.

Recently, crimes of leaking electronic files stored in a client terminal of a company abruptly increase. Accordingly, it is required to develop an apparatus, a method and a system for managing electronic files created and edited at a client terminal.

FIG. 1 is a conceptual view showing the entire configuration of a file management apparatus and a server according to an embodiment of a conventional technique.

Referring to FIG. 1, the file management method of the conventional technique is performed by one or more file management apparatuses 121, 122 and 123 connected to a server 110. Each of the file management apparatuses 120 may be a client file management program module installed in a client terminal in order to perform the file management method, or a client terminal including the client file management program module.

Each of the file management apparatuses 120 includes a management policy section, and the management policy section receives previously set management policies from the server 110. The management policies include information on extensions of predetermined electronic files (e.g., doc, hwp, xls and the like) and information on predetermined keywords.

The client terminal is provided with a management space, which is a storage space of the server 110 related to the user of the client terminal, from the server 110.

The client terminal may generate a storage event for an electronic file created as a result of a work performed by the user. For example, after the user of the client terminal creates a document using a word processor, a storage event for storing the document into My Document folder in Drive C may be generated.

A determination unit included in the file management apparatus 120 determines whether or not a work file created or edited and to be stored in the client terminal is a management target file, i.e., a target to be managed, referring to the management policies.

For example, if the management policies include information such as "doc, hwp and xls" as information on the predetermined extensions, it is determined whether or not the work file is a management target file based on whether or not the work file generating the storage event is a Word file (i.e., a file having 'doc' as an extension).

In addition, if the management policies include information such as "Confidential, Accounting, and Finance" as information on the predetermined keyword information, it is filtered to determine whether or not the "Confidential, Accounting, or Finance" is included in the contents of the work file generating the storage event, and it is determined whether or not the corresponding work file is a management target file based on a result of the filtering.

If the work file generating the storage event at the client terminal is not a management target file as a result of the determination of the determination unit, the work file is stored in the storage space specified by the user of the client terminal. However, if the work file is a management target file, it is controlled not to store the management target file in the storage space of the client terminal.

Although the conventional technique may prevent leakage, copy, and theft of files by prohibiting files of a specific type from being stored in a local PC (a client terminal), basically, it cannot disable a temporary storing process performed when a document is created or updated at the local PC, and thus it is impossible to fundamentally prevent data from being remained in the local PC.

Furthermore, since the conventional technique does not describe the process performed to obtain an approval when the data processed in the local PC is copied and taken out using a USB memory or attached to an e-mail and transmitted to another user, it is difficult to transfer and share a file.

SUMMARY OF THE INVENTION

Therefore, the present invention has been made in view of the above problems, and it is an object of the present invention to provide a file management method in a web storage system, in which file storage spaces are monitored and files are deleted so that files of a specific type may not be stored at all in a user terminal of a user who creates and stores a file while the user is connected to a file management system which provides a web storage service.

In addition, another object of the present invention is to provide a file management method in a web storage system, in which files of a specific type are stored only in a file management system, not in a user terminal, and information such as the name, stored location, and attributes of a file is created as a separate data and managed by a DBMS.

In addition, another object of the present invention is to provide a file management method in a web storage system, in which when a user calls and opens a specific file at a user terminal and performs a work for updating contents of the file, the file management system processes the entire procedure from the start to the end (storing) of the work in one transaction while possessing all the rights for opening, closing and updating the file, and thus none of data remains in the user terminal.

In addition, another object of the present invention is to provide a file management method in a web storage system, in which when a user desires to transfer a file stored in the file management system to another user by using a USB memory or attaching the file to an e-mail, the file link information can be copied or attached only when a manager approves transfer of the file.

To accomplish the above object, according to one aspect of the present invention, there is provided a file management method in a web storage system, in which files of a specific type are managed not to be stored in a first user terminal 200 by a file management system 100 which provides a web storage service for storing a file created by the first user terminal 200 connected through a network, the method including: a first step of transmitting and installing a file management client program in the first user terminal 200 by a file management server 102 included in the file management system 100, if the first user terminal 200 connects to the file management system 100 through a LAN or an Internet 400; a second step of starting file monitoring on the first user terminal 200 by the file management client program, after the file management client program sets and stores a file management policy that will be applied to the first user terminal 200; a third step of transmitting a file having an extension set as a monitoring target in the file management policy to the file management system 100 and deleting the file from the first user terminal 200 by the file management client program, if the file management client program finds the file while monitoring the first user terminal 200; a fourth step of storing the transmitted file in a file DB 104 and recording information for searching for the file using a DBMS by the file management server 102; a fifth step of allowing the first user terminal 200 to connect to the file DB 104 through a network file system driver and open a specific stored file by the file management server 102, if the first user terminal 200 connects to the file management system 100 and requests the specific file; and a sixth step of performing a process of updating and storing the file in one transaction and storing details of the update in the file DB 104 by the file management server 102, if the first user terminal 200 updates contents or attributes of the file and requests to store the updated file.

The file management method further includes: a seventh step of storing approval application information in an approval information DB 108 by a take-out information management server 106, if the file management system 100 receives an application for taking out a specific file through a USB memory, from the first user terminal 200 where the file management client program is installed; an eighth step of updating the approval information DB 108, if a manager approves take-out of the file through a manager terminal 300; a ninth step of connecting to the file management system 100 and transmitting information on approval and information on a target file to be copied, if the USB memory is connected to the first user terminal 200 and a worker clicks a file download button; a tenth step of confirming whether or not the approval is normally obtained and transferring information on a location where the file is stored to the file management client program by the take-out information management server 106; an eleventh step of downloading and storing the file into the USB memory by the file management client program, if the file management server 102 unlocks security (locking) locked on the file; and a twelfth step of locking the security again for the corresponding file by the file management server 102, if take-out of the file is completed.

The file management method further includes: a seventh step of storing approval application information in an approval information DB 108 by a take-out information management server 106, if the file management system 100 receives an application for taking out a specific file through an e-mail, from the first user terminal 200 where the file management client program is installed; an eighth step of updating the approval information DB 108, if a manager approves take-out of the file through a manager terminal 300; a ninth step of transferring file link information to the first user terminal 200, in which the file link information is URL information on a location where a target file to be taken out is stored; a tenth step of composing an e-mail attaching the file link information and transmitting the e-mail to a receiver by the first user terminal 200; and an eleventh step of transmitting a file corresponding to the file link information to a second user terminal 500 through the Internet 400 by the file management server 102, if the receiver receives the e-main using the second user terminal 500 and connects to the file management system 100 through the Internet 400 by clicking the attached file link information.

The file having an extension set as a monitoring target in the file management policy is any one or more of a word processor file, a presentation file, a spreadsheet file, a postscript file, a compressed file, a CAD file, a moving image file, a still image file, and an audio file.

DESCRIPTIONS OF SYMBOLS

| | |
|---|---|
| 100: File management system | 102: File management server |
| 104: File DB | |
| 106: Take-out information management server | |
| 108: Approval information DB | 200: First user terminal |
| 300: Manager terminal | 400: Internet |
| 500: Second user terminal | |

DETAILED DESCRIPTION OF THE PREFERRED EMBODIMENT

Hereinafter, "A file management method in a web storage system" according to an embodiment of the present invention will be described with reference to the accompanying drawings.

Figure 1:
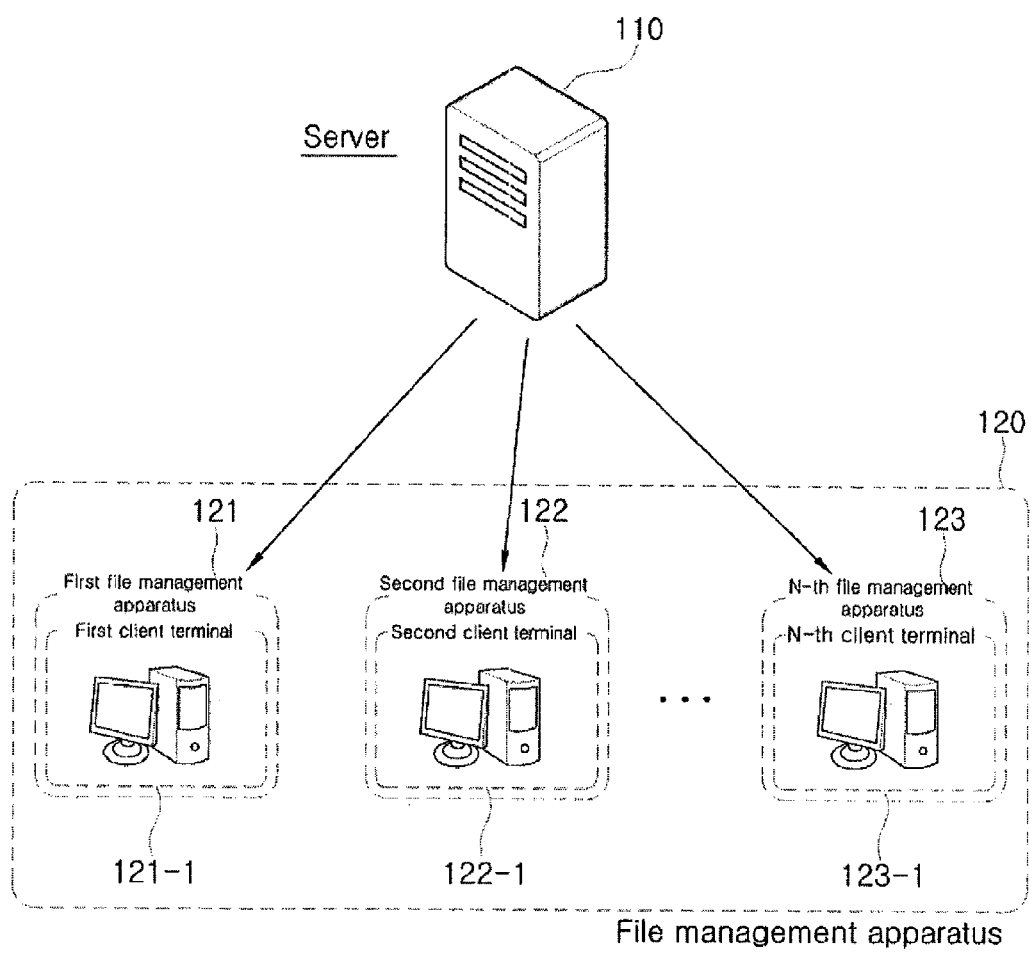
FIG. 1 is a conceptual view showing the entire configuration of a file management apparatus and a server according to an embodiment of a conventional technique.
Figure 2:
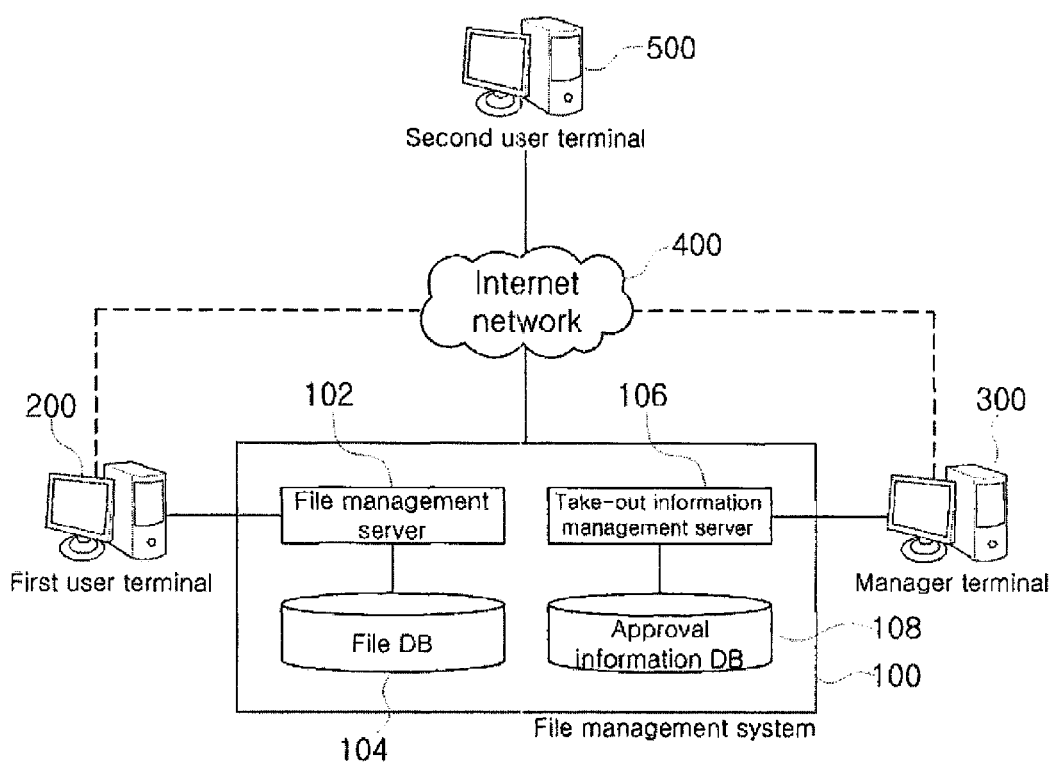
FIG. 2 is a block diagram showing the connection state of a file management system according to an embodiment of the present invention.

FIG. 2 is a block diagram showing the connection state of a file management system according to an embodiment of the present invention.

In order to implement the file management method of the present invention, a file management system 100 and user terminals 200 and 500 connected to each other through a LAN or the Internet 400 and a manager terminal 300 connected to the file management system 100 are required.

The file management system 100 stores a file created at a terminal connected through a network and provides a web storage service for providing valid users with the stored file. A user may store a file created by the user in the file management system 100 only if the user connects to the network, and read and work on a desired file at any time.

The file management system 100 monitors files so that files of a specific type may not be stored in the user terminal 200 or 500 and may remain only in the file management system 100.

The file management system 100 receives and stores a file created by a user working at the user terminal 200 or 500. If the user requests the file again, the file management system 100 opens and transmits the file to the user terminal 200 or 500 so that a work for updating the file may be allowed. If the user completes working on the file, the file management system 100 controls the file so that none of data may remain in the user terminal 200 or 500 and stores the updated file in the file management system 100.

The file management system 100 includes a file management server 102 for monitoring and controlling files created or stored in the user terminals 200 and 500, and a file DB 104 for storing files of predetermined types.

The file management system 100 further includes a takeout information management server 106 for confirming approval information and approving take-out of a file stored in the file DB 104 when the file is transferred to another user, and an approval information DB 108 for storing details of approval granted by the manager.

The file management server 102 installs a file management client program in the user terminals 200 and 500 and controls a work for storing a specific file through a communication with the user terminals 200 and 500.

The file management client program is installed in each of the user terminals 200 and 500, and if files of a specific type are found while the file management client program monitors creating, updating, and storing of files performed on the client terminals, the file management client program transmits, deletes, and stores the files based on previously set management policies.

In the present invention, it is described that the file management client program is installed in the first user terminal 200, and the file management client program monitors, transmits and deletes specific files while it is executed in the first user terminal 200.

A worker creates, updates, and stores a variety of documents, worksheets, and multimedia files using the first user terminal 200. At this point, it is preferable not to store files of a specific type in the first user terminal 200 for the reason of security. The file management client program monitors and manages files that should be treated as secret or confidential not to be remained in the terminal of the worker.

The types of files that should not remain in the first user terminal 200 may be set on a variety of criteria, and file extensions are used as the criteria in the present invention. That is, a method of deleting all the files having '*.doc' as a file extension indicating a document of Microsoft Word and transmitting all the files having '*.mpeg' as a file extension indicating moving image data to the file management system 100 may be selected as the criteria.

Extensions of the files that can be managed by the file management client program of the present invention include various types of extensions. Typical are word processor files (doc, hwp, etc.), presentation files (ppt, etc.), spreadsheet files (xls, etc.), postscript files (pdf, etc.), compressed files (zip, alz, etc.), CAD files (cad, etc.), moving image files (asf, avi, mpeg, etc.), still image files (bmp, jpeg, phg, pst, etc.), and audio files (mp3, wma, etc.).

Various types of extensions may be included as extensions of the files to be managed depending on a user's selection, and the extensions may be deleted or changed by modifying settings of the file management client program.

A specific file management method will be described below with reference to FIG. 3.

Figure 3:
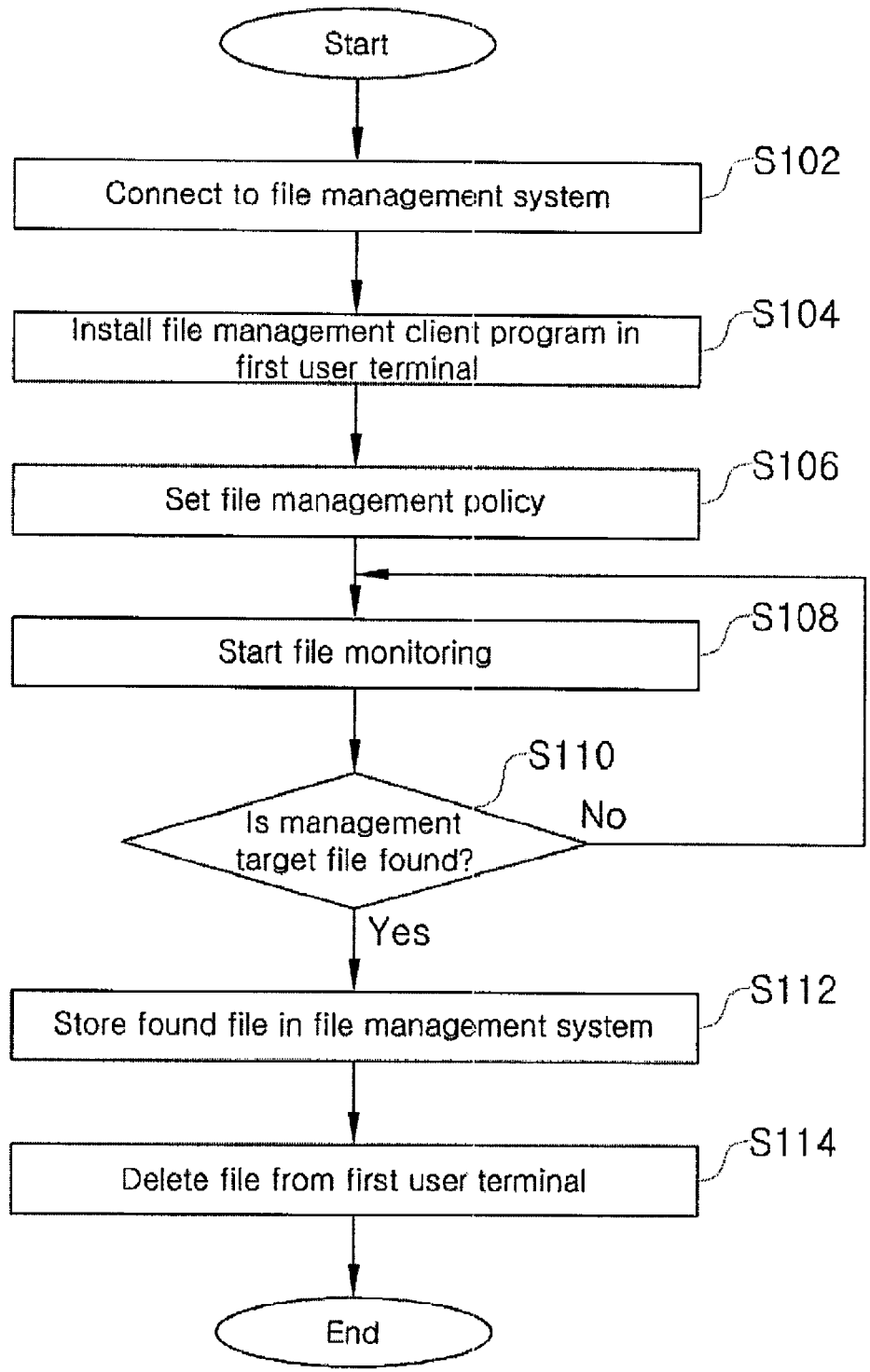
FIG. 3 is a flowchart illustrating a process of performing a file management method in a user terminal.

FIG. 3 is a flowchart illustrating a process of performing a file management method in a user terminal.

First, the first user terminal 200 of a user (a worker) connects to the file management system 100 through a LAN or the Internet 400 S102. This work is generally performed using a personal computer (PC) or the like installed in a company, and the present invention may be applied to many cases for maintaining security of the company. The first user terminal 200 connects to the file management system 100 mainly through the LAN. However, the first user terminal 200 may connect to the file management system 100 through the Internet 400 in order to manage works carried out at home or during a business trip.

If the file management client program is installed in the first user terminal 200, files can be processed or monitored immediately. However, if the file management client program is not installed, the file management client program should be installed in the first place S104. The file management server 102 confirms whether or not the file management client program is installed in the terminal connected to the file management system 100 and controls the terminal to perform an installation process.

The file management client program sets and stores file management policies that will be applied to the first user terminal 200 S106. The file management client program sets types of files that should be deleted from the first user terminal 200 based on file extensions. The types of files to be monitored are preferably selected by the file management system 100, not by the user of the first user terminal 200. That is, the file management server 102 determines extensions of files to be deleted, and the user of the first user terminal 200 is allowed only to add files of a specific type as a target of management.

Since files are monitored or deleted based on the file extensions, the files may be deleted if extensions are the same although the files are actually of different types (Hangul document files stored attaching file extension 'doc').

If the file management client program is installed and setting of monitoring policies is completed, file monitoring of the file management client program is started for the first user terminal 200 S108.

The file monitoring is performed in a variety of ways depending on settings of the manager. That is, although a method of searching for a specific file by searching the entire storage space of the first user terminal 200 may be general, only a specific folder may be specified to be searched. In addition, although all previously stored files may be searched, only newly created or stored files may be monitored.

The file management client program monitors creating and storing of files performed in the first user terminal 200, and if a file of a specific type previously set to be monitored is found (a file having a specific extension), the file management client program transmits the file to the file management system S110 and S112. The transmitted file is stored in the file DB 104, and the file management server 102 manages information needed to search for the corresponding file (file location, file name, creation time, file size, etc.) in a separate database management system (DBMS).

If a file corresponding to be deleted is found and the file is used by another program, it is preferable to transmit the file after work of the program is finished and storing the file is completed.

Finally, the file management client program permanently deletes the corresponding file from the first user terminal S114. Deletion of the file and transmission of the file to the file management server 102 may be simultaneously performed.

If the user desires to read the file transmitted to the file management server 102 (a file of a type set as a target of monitoring policy) and work on the file, the user connects to the file management system 100, obtains user authentication, reads the corresponding file stored in the file DB 104, and works on the file. In the conventional technique, if working on the file is completed, the file is once stored in the local terminal and transmitted to a central server. In this process, the files stored in the local terminal may be in the risk of being leaked out.

In the present invention, a procedure of 'file open—update—close' is processed in one transaction like in a network file system so that none of data may be stored in the first user terminal 200.

If the first user terminal 200 connects to the file management system 100 and requests a specific file, a transaction is started, and information on the location where the file is stored is read after authority of the connected user is confirmed. The file is searched for based on the read information and provided to the first user terminal 100. The user of the first user terminal 200 directly accesses the file DB 104 through a network file system driver. If the user finishes the work and selects file close, the DBMS of the file management server 102 records and stores details of update directly into the file DB 104. With the file close, all the data temporarily loaded on the memory of the first user terminal 200 are deleted.

All of these steps are processed in one transaction, and details of update on the contents of the file are recorded by the DBMS.

Although the files stored in the file management system 100 by the file management client program are read and used by the user, a transfer medium should be used in order to transfer the files to other persons. To this end, a method of storing files in a USB memory and a method of transferring files using an e-mail are used in the present invention, and these will be described below one by one.

Figure 4:
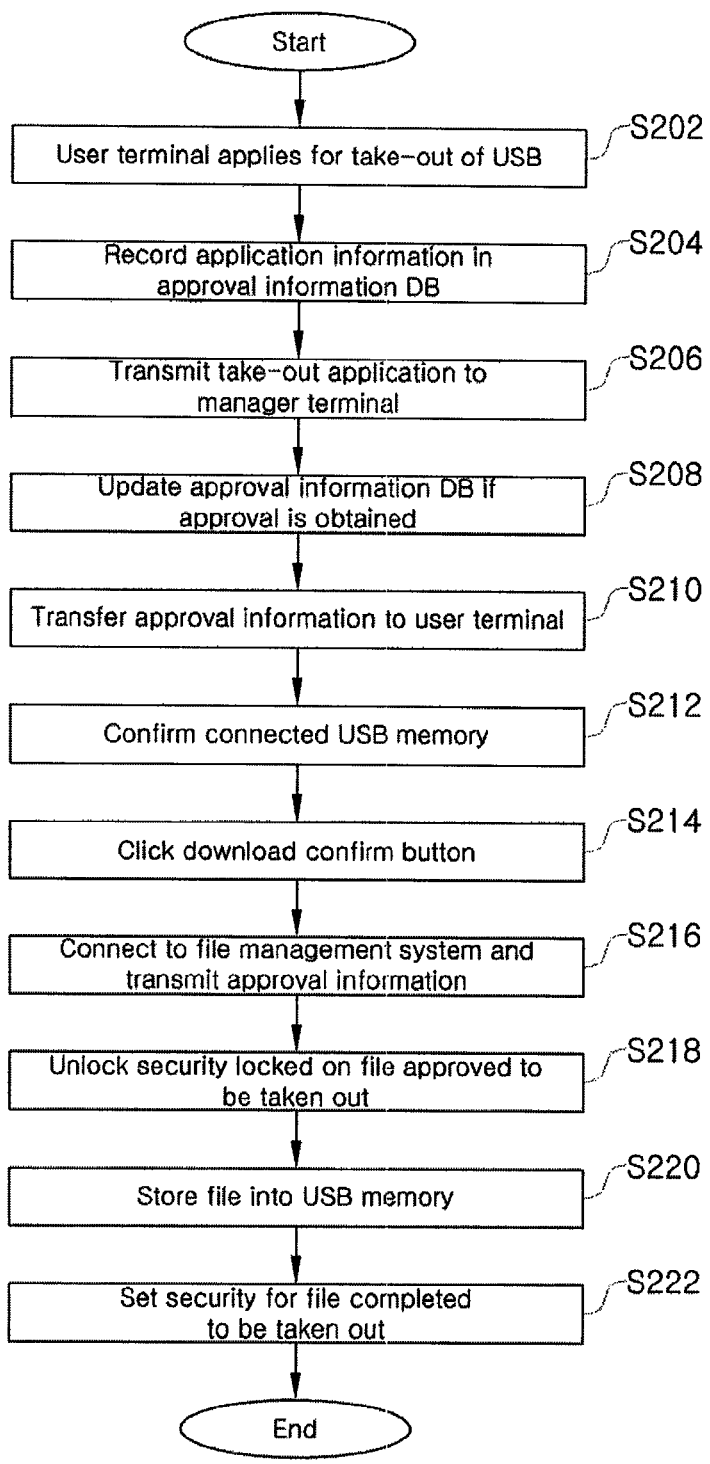
FIG. 4 is a flowchart illustrating a process of copying a file into a USB memory.

FIG. 4 is a flowchart illustrating a process of copying a file into a USB memory.

In order to copy and take out a file to outside using a USB memory, the file management client program should be installed in the user terminal so as to recognize information on approval for the take-out, and it should be confirmed that whether or not the connected USB memory is an authorized medium. In the present invention, it will be described based on the first user terminal 200 where the file management client program is installed.

First, a worker who desires to copy and take out a file applies for take-out of a USB memory through the first user terminal 200 using the file management client program S202.

If the file management system 100 receives the take-out application, the take-out information management server 106 records approval application information, i.e., an index of the file and the like, in an approval information table having a created approval index as a key, and stores the approval information table in the approval information DB S204.

The file management system 100 transmits file take-out application information to the manager terminal 300, and the file management system 100 turns into an approval waiting state S206.

If the manager approves take-out of the file through the manager terminal 300, approval grant or rejection information in the approval information table of the approval information DB 108 is updated S208.

If take-out of the file is approved, the take-out information management server 106 notifies the first user terminal 200 that approval for the file take-out application is completed S210. This notification may be informed to the user through the file management client program.

If the worker connects a USB memory to the first user terminal 200 in order to copy the file, an identification number of the connected medium and whether or not a security program is installed are confirmed S212. The identification number of the USB memory and the security program are confirmed in order to use only an approved medium, and an unconfirmed medium may be approved to be used in some cases.

The worker clicks a file download and USB memory store button at the first user terminal 200 S214. The file management client program may implement the file download and USB memory store button on a separate input window.

The file management client program connects to the file management system 100 and transmits information on approval and information on the target file to be copied S216. The take-out information management server 106 compares the transmitted approval information with the approval information table stored in the approval information DB 108 to confirm whether or not the approval is normally obtained. Then, the take-out information management server 106 transfers information on the location where the corresponding file is stored (location of the file DB or the like) to the file management client program.

The file management client program receives the information from the web through Active X, and a broker process (e.g., USBDownloader.exe) executed by the Active X takes over the information possessed by the Active X.

The broker process performs pipe communication with the file management system 100 as soon as the worker presses the file download and USB memory store button, and the file management server 102 momentarily unlocks security (locking) locked on the corresponding file so that the broker process may download the file S218.

The file management client program searches for and downloads a corresponding file from the file DB 104 and stores the file into the connected USB memory S220.

If take-out of the file is completed, the broker process notifies the file management server 102 that the file has been stored, and the process of taking out the file is completed if the file management server 102 locks the security again for the corresponding file S222.

Figure 5:
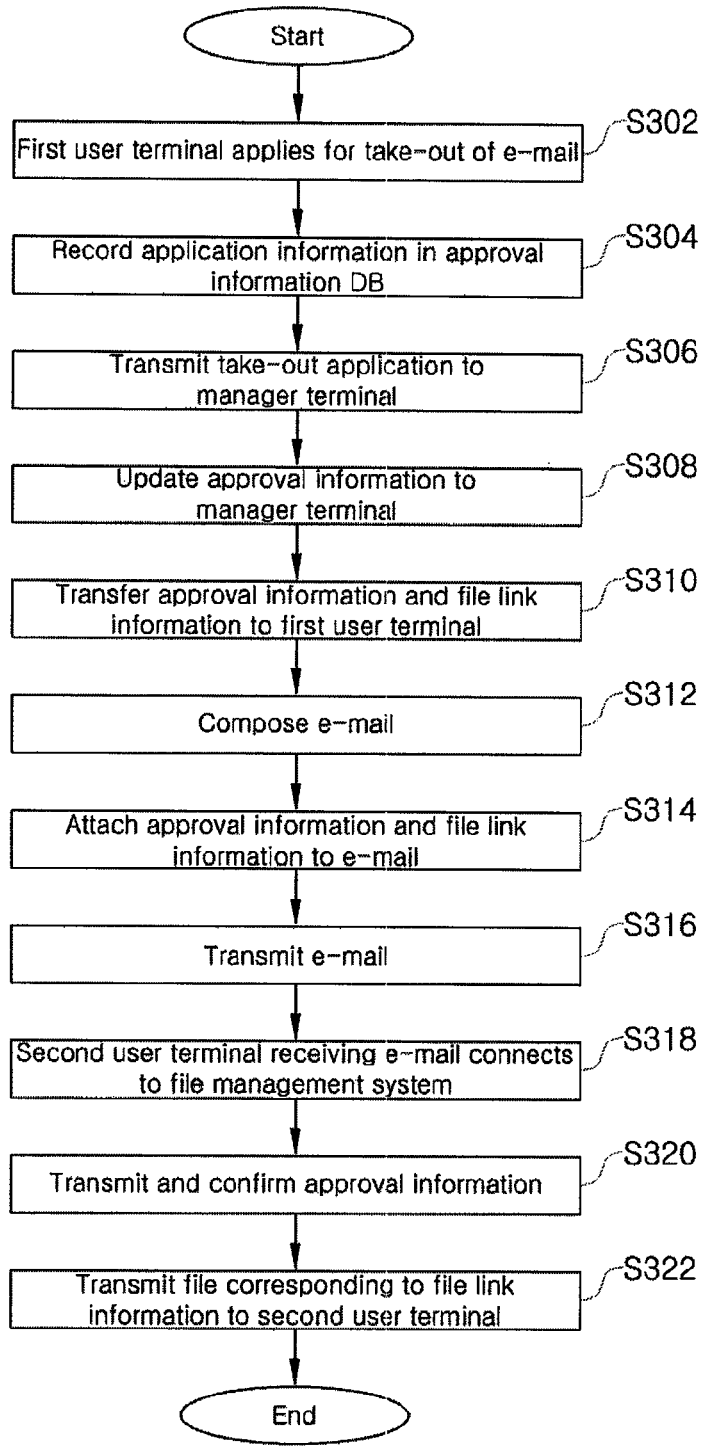
FIG. 5 is a flowchart illustrating a process of attaching a file to an e-mail.

FIG. 5 is a flowchart illustrating a process of attaching a file to an e-mail.

It is described that transmission of a file through an e-mail is performed between the first user terminal 200 where the file management client program is installed and the second user terminal 500 where the file management client program is not installed.

First, a worker submits an application for taking out a file through an e-mail to the take-out information management server 106 using the first user terminal 200 S302. Take-out of a file through an e-mail is also accomplished through the file management client program.

The take-out information management server 106 records take-out application information in the approval information DB 108 and transmits details of the application to the manager terminal 300 to request approval for the application S304 and S306.

If the manager approves take-out of the file through an e-mail using the manager terminal 300, an approval grant or rejection value in the approval information table of the approval information DB is updated S308.

The steps of applying for take-out of a file, recording approval information, granting approval by the manager, and updating approval information are the same as the steps of taking out a file through a USB memory.

If take-out of the file through an e-mail is approved, the take-out information management server 106 notifies the first user terminal 200 that application for taking out the file is approved and transfers approval information and file link information to the first user terminal 200 S310.

The file link information is URL information on the location where the file is stored, which is information for a user who receives the e-mail to connect to a server at a corresponding location through the Internet 400 and download the file directly from the server. The present inventors have already disclosed a technique for attaching link information of a large-scale or multimedia file to an e-mail so that a receiver may directly connect and download the file, and thus details thereof will be omitted.

The worker of the first user terminal 200 composes an e-mail, attaches the approval information and the file link information to the e-mail, and transmits the e-mail to the receiver S312, S314, and S316.

The e-mail transmitted by the first user terminal 200 is transmitted to the receiver (the user of the second user terminal 500), and the receiver connects to the take-out information management server 106 of the file management system 100 by clicking the approval information or the file link information S318. The second user terminal 500 connects to the take-out information management server 106 through the Internet 400.

The take-out information management server 106 analyzes the approval information transmitted from the second user terminal 500 and confirms whether or not take-out of the file is approved through a valid approval process S320.

If the approval information is confirmed, the file management system 100 permits the second user terminal 500 to connect to the file DB 104, and the file management server 102 transmits a file corresponding to the file link information to the second user terminal 500 through the Internet 400 S322. The transmitted file will be permanently stored in the storage space of the second user terminal 500.

According to the present invention, when a file is created and stored using a web storage system, none of data related to a file that may cause a security problem remains in a user terminal of a remote site, and thus a file leakage problem may be cleared.

In addition, according to the present invention, when a file stored in a web storage system is transferred to another user, the file can be copied or attached after obtaining an approval from a manager having a right to approve, and thus leakage of computer files can be prevented, and it is possible to clarify where the responsibility lies when a security incident occurs.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A file management method in a web storage system, in which files of a specific type are managed by a file management system which provides a web storage service for storing a file created by the first user terminal connected through a network, the method comprising:
    a first step of transmitting and installing a file management client program in the first user terminal by a file management server included in the file management system, if the first user terminal connects to the file management system through a LAN or an Internet;
    a second step of starting file monitoring on the first user terminal by the file management client program, after the file management client program sets and stores a file management policy that will be applied to the first user terminal;
    a third step of transmitting a file having an extension set as a monitoring target in the file management policy to the file management system and deleting the file from the first user terminal by the file management client program, if the file management client program finds the file while monitoring the first user terminal;
    a fourth step of storing the transmitted file in a file DB and recording information for searching for the file using a DBMS by the file management server;
    a fifth step of allowing the first user terminal to connect to the file DB through a network file system driver and open a specific stored file by the file management server, if the first user terminal connects to the file management system and requests the specific file;
    a sixth step of performing a process of updating and storing the file in one transaction and storing details of the update in the file DB by the file management server, if the first user terminal updates contents or attributes of the file and requests to store the updated file
    a seventh step of storing approval application information in an approval information DB by a take-out information management server, if the file management system receives an application for taking out a specific file through a USB memory, from the first user terminal where the file management client program is installed;
    an eighth step of updating the approval information DB, if a manager approves take-out of the file through a manager terminal;
    a ninth step of connecting to the file management system and transmitting information on approval and information on a target file to be copied, if the USB memory is connected to the first user terminal and a worker clicks a file download and USB memory store button;
    a tenth step of confirming whether or not the approval is normally obtained and transferring information on a location where the file is stored to the file management client program by the take-out information management server;
    an eleventh step of downloading and storing the file into the USB memory by the file management client program, if the file management server unlocks security (locking) locked on the file; and
    a twelfth step of locking the security again for the corresponding file by the file management server, if take-out of the file is completed.

2. A file management method in a web storage system, in which files of a specific type are managed by a file management system which provides a web storage service for storing a file created by the first user terminal connected through a network, the method comprising:
    a first step of transmitting and installing a file management client program in the first user terminal by a file management server included in the file management system, if the first user terminal connects to the file management system through a LAN or an Internet;
    a second step of starting file monitoring on the first user terminal by the file management client program, after the file management client program sets and stores a file management policy that will be applied to the first user terminal;
    a third step of transmitting a file having an extension set as a monitoring target in the file management policy to the file management system and deleting the file from the first user terminal by the file management client program, if the file management client program finds the file while monitoring the first user terminal;

a fourth step of storing the transmitted file in a file DB and recording information for searching for the file using a DBMS by the file management server;

a fifth step of allowing the first user terminal to connect to the file DB through a network file system driver and open a specific stored file by the file management server, if the first user terminal connects to the file management system and requests the specific file;

a sixth step of performing a process of updating and storing the file in one transaction and storing details of the update in the file DB by the file management server, if the first user terminal updates contents or attributes of the file and requests to store the updated file, a seventh step of storing approval application information in an approval information DB by a take-out information management server, if the file management system receives an application for taking out a specific file through an e-mail, from the first user terminal where the file management client program is installed;

an eighth step of updating the approval information DB by the take-out information management server, if a manager approves take-out of the file through a manager terminal;

a ninth step of transferring file link information to the first user terminal, in which the file link information is URL information on a location where a target file to be taken out is stored;

a tenth step of composing an e-mail attaching the file link information and transmitting the e-mail to a receiver by the first user terminal; and an eleventh step of transmitting a file corresponding to the file link information to a second user terminal through the Internet by the file management server, if the receiver receives the e-main using the second user terminal and connects to the file management system through the Internet by clicking the attached file link information.

3. The method according to claim 1, wherein the file having an extension set as a monitoring target in the file management policy is any one or more of a word processor file, a presentation file, a spreadsheet file, a postscript file, a compressed file, a CAD file, a moving image file, a still image file, and an audio file.

4. The method according to claim 1, wherein the file having an extension set as a monitoring target in the file management policy is any one or more of a word processor file, a presentation file, a spreadsheet file, a postscript file, a compressed file, a CAD file, a moving image file, a still image file, and an audio file.

5. The method according to claim 2, wherein the file having an extension set as a monitoring target in the file management policy is any one or more of a word processor file, a presentation file, a spreadsheet file, a postscript file, a compressed file, a CAD file, a moving image file, a still image file, and an audio file.

* * * * *